Dec. 31, 1963  O. A. KINZIE ETAL  3,116,067
UNITARY RING INSERT SEALING FACE AND ADAPTER ASSEMBLY
Filed June 29, 1959  3 Sheets-Sheet 1

INVENTORS
ORA A. KINZIE
HUBERT J. WATTS
BY
ATTORNEY

Dec. 31, 1963  O. A. KINZIE ETAL  3,116,067
UNITARY RING INSERT SEALING FACE AND ADAPTER ASSEMBLY
Filed June 29, 1959  3 Sheets-Sheet 2

INVENTORS
ORA A. KINZIE
HUBERT J. WATTS
BY
ATTORNEY

Dec. 31, 1963 O. A. KINZIE ETAL 3,116,067
UNITARY RING INSERT SEALING FACE AND ADAPTER ASSEMBLY
Filed June 29, 1959 3 Sheets-Sheet 3

INVENTORS
ORA A. KINZIE
HUBERT J. WATTS
BY
Jerome B. Peterson
ATTORNEY

United States Patent Office 3,116,067
Patented Dec. 31, 1963

3,116,067
UNITARY RING INSERT SEALING FACE AND ADAPTER ASSEMBLY
Ora A. Kinzie and Hubert J. Watts, Ponca City, Okla., assignors to Continental Oil Company, Ponca City, Okla., a corporation of Delaware
Filed June 29, 1959, Ser. No. 823,576
2 Claims. (Cl. 277—170)

This invention relates to fluid pressure seals suitable for use in connecting two conduits, one of which is rotatable with respect to the other, for the purpose of rendering the connection fluid tight. The article is usable for accomplishing fluid connection when used in conjunction with a similar abutting counterpart mating face and suitable interconnecting or coupling means.

The design of insert-adapter combinations of the type of which this invention is directed is highly specialized art and gives rise to problems not inherent in the general fluid seal art. For example, the device of this invention is employed in connecting a fluid conduit to a rotatable multi-phase centrifugal extractor. Such apparatus is often used with corrosive liquids such as concentrated sulfuric acid under severe operating conditions involving elevated temperatures and pressures and rotational velocities on the order of two or three thousand revolutions per minute. It has been found heretofore that the very hard cemented metal carbides, as for example tungsten carbide are best suited for the rigors of high temperature, pressures, and rotational velocities of the degree hereinabove mentioned; however, although bearing faces composed of such materials are very suitable in operation, they are, because of these same properties of hardness, very brittle and in general difficult to work. Considerable difficulty is encountered in securing inserts produced of such alloys to the seal adapter. Heretofore, for example, tungsten carbide ring inserts have been secured to the seal adapter by sweating or shrink fitting. Both of these methods involving high temperatures usually produce unequal thermal expansion in the ring insert and the adapter which in turn often results in distortion on cooling. In shrink fitting, an adapter of slightly smaller internal diameter than the outer diameter of a ring insert is heated until thermal expansion permits the insertion of the ring insert into the adapter. Upon cooling, the adapter contracts around said ring insert whereby said ring insert is held in place under sufficient compressional force to prevent any movement of the insert as then bound by the adapter. This method of fitting a ring insert to an adapter causes stresses to be set up in the cemented carbide which can, and sometimes does, cause warping and distortion of the metal due to the temperatures necessary for sufficient thermal expansion. Warping may also occur after cooling and sometimes is directly attributable to the stresses originating as the adapter contracts around the ring insert. Because of the brittleness of the metal carbide, the ring and/or adapter may even break under the stresses of compression eventually occurring upon cooling and contracting of the heated adapter. Breakage may occur spontaneously or from ordinarily harmless minor mechanical shocks facilitated by the internal stresses. Breakage is of considerable consequence economically because of the high cost of the metals involved and of machining such unique materials, especially if breaking occurs in the final step of fitting the ring insert to the adapter. The above is particularly true in the case of breaking of the ring insert itself. Breakage, however, is not the only disadvantage to the sweating and shring-fitting methods. Warping and distortion are equally extremely detrimental. If a ring insert is warped and/or distorted, the seal will not be fluid tight; and the wearing qualities are substantially reduced. While it is entirely possible to work with hot metals, the working and fitting of such is difficult and cumbersome and therefore not to be desired.

It is therefore the principal object of this invention to provide a combination of a hard-faced ring insert and an adapter for use in rotary conduits.

It is another object of the invention to secure a ring insert to an adapter such that there is no longitudinal or rotational movement of the insert with respect to the adapter during operation.

It is a further object of the invention to eliminate or at least substantially reduce breakage of ring inserts and adapters whereby economic advantages accrue.

It is another object to provide for securely fitting a tungsten carbide ring insert to an adapter without warping and distortion, such that the seal in operation will provide a fluid tight connection of conduit and have better wear qualities.

Still another object is to provide a more facilitory, less difficult arrangement of component parts in the fitting step by providing for same to be carried out while said parts are cool.

Other objects and advantages will become apparent to those skilled in the art from the hereinafter more detailed descriptive discussion.

The following drawings illustrating a limited number of embodiments of the invention in plan and cross-sectional views will materially aid the understanding of the invention.

A more detailed description of the invention with reference to the drawings will be found hereinbelow, but briefly the figures may be described as follows.

Figure 1:
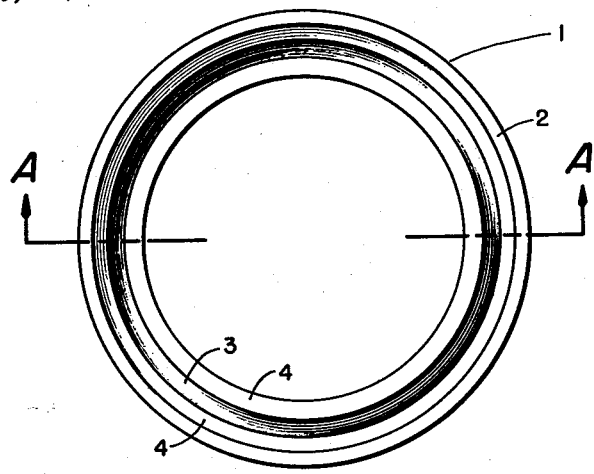
FIGURE 1 is a plan view along the axis of the tubular adapter.
Figure 1A:
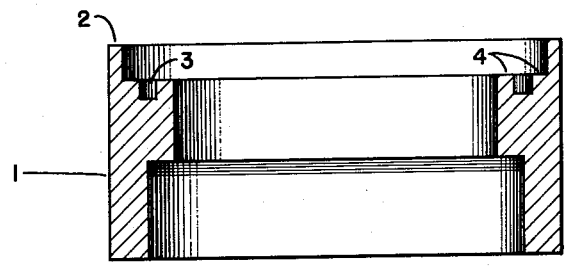
FIGURE 1A is a cross-sectional view, along the line A—A of the adapter of FIGURE 1.
Figure 1B:
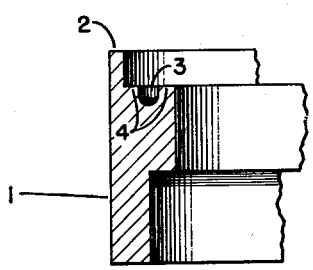
FIGURE 1B is a limited cross-section of FIGURE 1, also along line A—A, showing another form of gasket groove.
Figure 2:
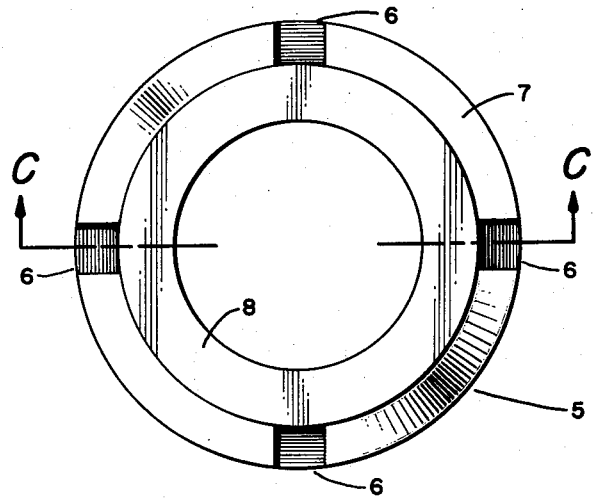
FIGURE 2 is a plan view of the insert ring along its circular axis.
Figure 2C:
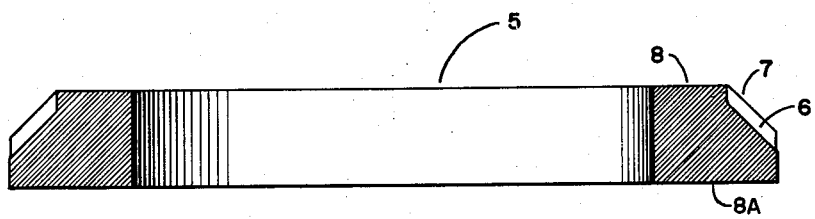
Figure 2C:
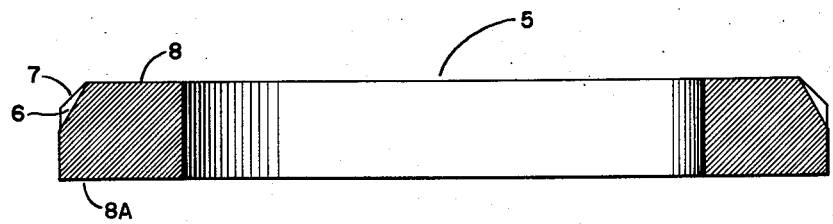

FIGURES 2C and 2C' are blown-up cross-sectional views showing two different embodiments of the insert ring of FIGURE 2 along line C—C.

Figure 3:
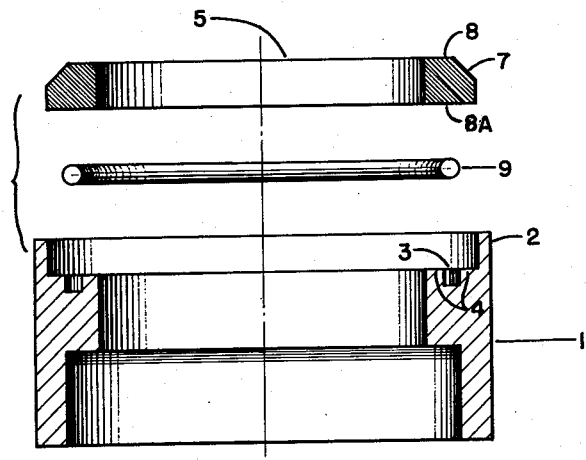

FIGURE 3 is a cross-sectional exploded view of the assemblage.

Figure 4:
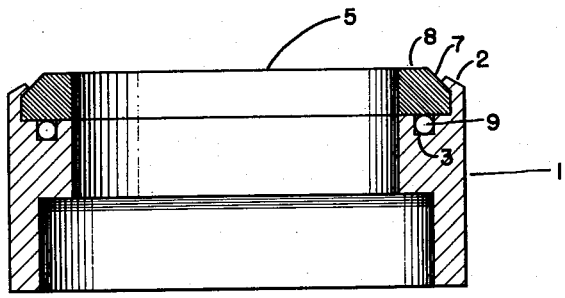

FIGURE 4 is a cross-sectional view of the unitary adapter and insert ring assemblage in finished form.

Figure 5:
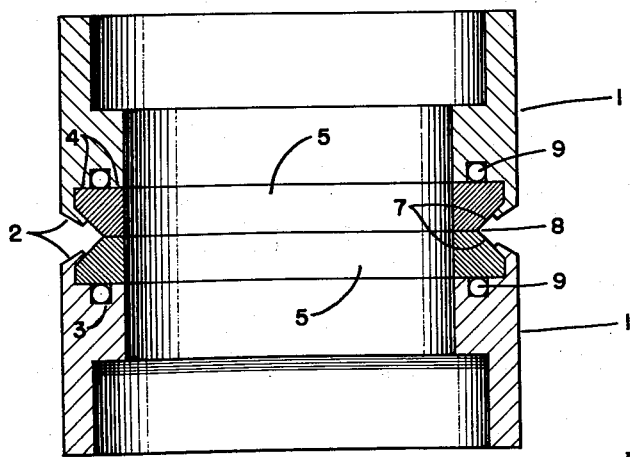

FIGURE 5 is a cross-sectional view of two sealingly engaged insert rings and adapters as used without connecting conduits and encompassing coupling means.

To the accomplishment of the foregoing and related ends, a tubular adapter 1 is machined in the annulus of one end to provide an annular shoulder 4 in said end and a thin outer lip 2 extending as an integral part of the outer face of said tubular adapter. In the face of the annular shoulder 4 of said adapter, an annular groove 3 having a rectangular cross-section is cut for placing a resilient gasket 9 therein. Washer-like annular wear-resistant insert ring 5 has machined front and back faces 8 and 8A, respectively, and a beveled outer peripheral edge, the face 7 of said beveled edge having a plurality of notches 6 cut therein. The faces 8 and 8A are machined smooth and flat, and front face 8 is highly polished as by lapping.

A resilient gasket such as a rubber O ring 9 is placed in the annular groove of the inwardly extending shoulder of the tubular adapter. This O ring may be made of any other suitable resilient material such as a fluorocarbon resin plastic, as for example, Teflon, although the choice of material is dependent on such things as the operating temperature and/or the corrosiveness of the fluid involved. The ring insert 5 whose outer dimension is of such size as to fit closely within the annular lip and of a thickness slightly greater than the length of the lip is placed with the machined back face on the inward shoulder and O ring of the adapter. Then while pressing the ring insert tightly against the gasket to seat the back face of the insert upon the shoulder of the adapter, the outer lip of the adapter is rolled inwardly over the beveled face, thus providing a positive seal between the ring insert and the adapter. Some of the material from the lip is pressed into the notches, thus assuring that relative rotation between the ring-shaped seal and the adapter will not occur during use of the device.

The operation of rolling-in the lip as outlined above may be performed in any convenient manner. For example, the following technique is suitable. The adapter, gasket, and ring-shaped seal is placed in a lathe chuck. The ring-shaped seal is then urged against the gasket and seated upon the shoulder of the adapter by means of a small plate held by the tail stock of the lathe. A knurling tool having smooth rollers substituted for the cutting rollers is placed in the lathe tool holder and, during rotation of the assembly, the smooth rollers are urged against the lip of the rotated adapter with sufficient force to bend the lip into conformity with the beveled face of the seal and into the notches in said face. It will be apparent to those skilled in the art that other methods and apparatus may be employed to roll the lip into contact with the beveled face.

The angles of the beveled face on the peripheral edge of the ring insert and the angle of the notches in the face may be varied somewhat. As a general rule, however, an angle of about 45° for the beveled face will be preferred. The angle of the notches in the beveled face are preferably about 60°. Cumulatively FIGURES 2C and 2C' show two of the many varying embodiments of the locking notches in the beveled face. Usually four of such notches radially displaced as shown in FIGURE 2 will be suitable, convenient, and preferred.

The rolled-in lip, of course, must not protrude beyond the plane of the flat hard-face of the ring-shaped seal and is best a short distance behind said plane as shown in FIGURE 4 of the attached drawings.

This invention, of course, is not limited in practice to cemented carbides, and may be employed with inserts made of other materials suitable for the construction of hard-faced seals, for example, synthetic sapphire, Carborundum (i.e., a silicon carbide) and certain alloys such as Stellite (a family of non-ferrous alloys comprising about 40–80 weight percent cobalt, 20–35 percent chromium, 0–25 percent tungsten, 0.75–2.5 percent carbon, and 0–3 percent silicon). Sweating or shrink fitting may be employed with some metals without serious inherent disadvantages, but with the compositions utilized in inserts and adapters subjected to more rigorous conditions, the present method and construction is extremely important.

It is not necessary that both of the abutting counterpart mating faces of the seal proper be of identical composition. Usually, in practice, the two sealingly engaging hard-faces, as shown in FIGURE 5, are of different compositions.

The invention in practice is attached at the rear portion of the adapter to a conduit, and coupling means are employed to engage the hard-faces to provide a unitary seal. It will be recognized that routine modifications of the embodiments in the attached drawings will make the invention suitable for use with various conduit connecting and coupling means.

While particular embodiments of the invention have been described, it will be understood, of course, that the invention is not limited thereto, since many modifications may be made without departing from the true spirit and scope of the invention; and it is, therefore, intended to cover by the appended claims any such modifications as fall within the true spirit and scope of the invention.

We claim:

1. A unitary ring insert and adapter assembly comprising, in combination: a tubular adapter, a hard-faced ring insert, a circular resilient gasket, said tubular adapter having an inwardly extending annular shoulder, an annular gasket groove in the face of said shoulder, and a protruding lip adjacent the outer periphery of said shoulder, said resilient gasket positioned in said gasket groove, said insert having front and back flat faces and a beveled face on the outer peripheral edge adjacent the front face having a plurality of notches therein, the back face of said ring-shaped insert engagingly positioned on the annular shoulder face of the adapter and resilient gasket therein, said assembly being characterized further in that in finished form the lip of said adapter is conformed to fixedly engage the beveled face and notches of the ring insert.

2. The apparatus of claim 1 further characterized in that said hard-faced ring insert consists of tungsten carbide and the beveled face thereof is at an angle of about 45° with respect to the plane of front face of the ring insert.

References Cited in the file of this patent

UNITED STATES PATENTS

| 1,163,082 | Gold | Dec. 7, 1915 |
| 1,251,767 | Gold | Jan. 1, 1918 |
| 1,460,623 | Tobolla | July 3, 1923 |
| 2,160,298 | Weber | May 30, 1939 |
| 2,531,079 | Payne | Nov. 21, 1950 |
| 2,724,893 | O'Connor | Nov. 29, 1955 |
| 2,740,648 | Amblard | Apr. 3, 1956 |
| 2,995,391 | Snyder | Aug. 8, 1961 |
| 3,015,504 | Fulton et al. | Jan. 2, 1962 |

FOREIGN PATENTS

| 514,969 | Great Britain | Nov. 22, 1939 |

OTHER REFERENCES

Norton, R. D.: "Chemical Engineering," 277–93 Mechanical Seals, pages 199–210, September 1956. (Copy available in Div. 29.)